(12) United States Patent
Xia et al.

(10) Patent No.: US 12,348,291 B2
(45) Date of Patent: Jul. 1, 2025

(54) SIDELINK BEAM MANAGEMENT

(71) Applicant: Huawei Technologies Co., Ltd., Shenzhen (CN)

(72) Inventors: Pengfei Xia, San Diego, CA (US); Bin Liu, San Diego, CA (US); Young Hoon Kwon, Laguna Niguel, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 319 days.

(21) Appl. No.: 17/887,114

(22) Filed: Aug. 12, 2022

(65) Prior Publication Data
US 2022/0393741 A1 Dec. 8, 2022

Related U.S. Application Data

(63) Continuation of application No. PCT/US2020/022414, filed on Mar. 12, 2020.

(51) Int. Cl.
| | |
|---|---|
| *H04B 7/08* | (2006.01) |
| *H04B 7/06* | (2006.01) |
| *H04W 72/23* | (2023.01) |
| *H04W 74/0833* | (2024.01) |

(52) U.S. Cl.
CPC .......... *H04B 7/0632* (2013.01); *H04W 72/23* (2023.01); *H04W 74/0833* (2013.01)

(58) Field of Classification Search
CPC .. H04B 7/0617; H04B 7/0632; H04B 7/0639; H04B 7/0695; H04B 7/06954; H04B 7/088; H04W 16/28; H04W 72/23; H04W 72/04; H04W 72/046; H04W 72/20; H04W 74/002; H04W 74/0833; H04W 76/14; H04W 76/19; H04W 92/18
See application file for complete search history.

(56) References Cited

U.S. PATENT DOCUMENTS

| | | | |
|---|---|---|---|
| 11,178,565 B2 * | 11/2021 | Tseng | H04W 40/22 |
| 11,252,730 B2 * | 2/2022 | Kang | H04W 16/14 |
| 11,456,789 B2 * | 9/2022 | Hou | H04B 1/44 |
| 11,582,789 B2 * | 2/2023 | Kung | H04B 7/0626 |
| 2018/0049177 A1 | 2/2018 | Islam et al. | |
| 2018/0343595 A1 | 11/2018 | da Silva et al. | |
| 2018/0368126 A1 | 12/2018 | Islam et al. | |

(Continued)

FOREIGN PATENT DOCUMENTS

| | | |
|---|---|---|
| WO | 2019174532 A1 | 9/2019 |
| WO | 2020033795 A1 | 2/2020 |
| WO | 2020047024 A1 | 3/2020 |

*Primary Examiner* — Frank Duong
(74) *Attorney, Agent, or Firm* — Slater Matsil, LLP

(57) ABSTRACT

A method for sidelink beam reporting for device to device (D2D) communication includes receiving, by a first electronic device and from a base station, configuration of one or more beam management reference signals (BMRSs) on a sidelink between the first electronic device and a second electronic device and configuration of one or more sidelink random access channels (SL-RACHs), receiving and measuring, by the first electronic device and based on the received configuration of one or more BMRSs, a plurality of BMRSs transmitted by the second electronic device, and transmitting, by the first electronic device and based on the received configuration of one or more SL-RACHs, a SL-RACH to the second electronic device.

23 Claims, 4 Drawing Sheets

(56) References Cited

U.S. PATENT DOCUMENTS

| | | |
|---|---|---|
| 2019/0045569 A1 | 2/2019 | Abedini et al. |
| 2019/0116605 A1* | 4/2019 | Luo .................. H04W 72/0446 |
| 2019/0306924 A1 | 10/2019 | Zhang et al. |
| 2019/0364590 A1 | 11/2019 | Sartori et al. |
| 2020/0022089 A1 | 1/2020 | Guo |
| 2020/0029340 A1 | 1/2020 | He et al. |
| 2020/0045664 A1 | 2/2020 | Choi et al. |
| 2021/0160851 A1* | 5/2021 | Akkarakaran ........ H04W 76/14 |
| 2022/0286184 A1* | 9/2022 | Li ........................ H04L 5/0051 |
| 2022/0394697 A1* | 12/2022 | Kim ...................... H04W 72/54 |

\* cited by examiner

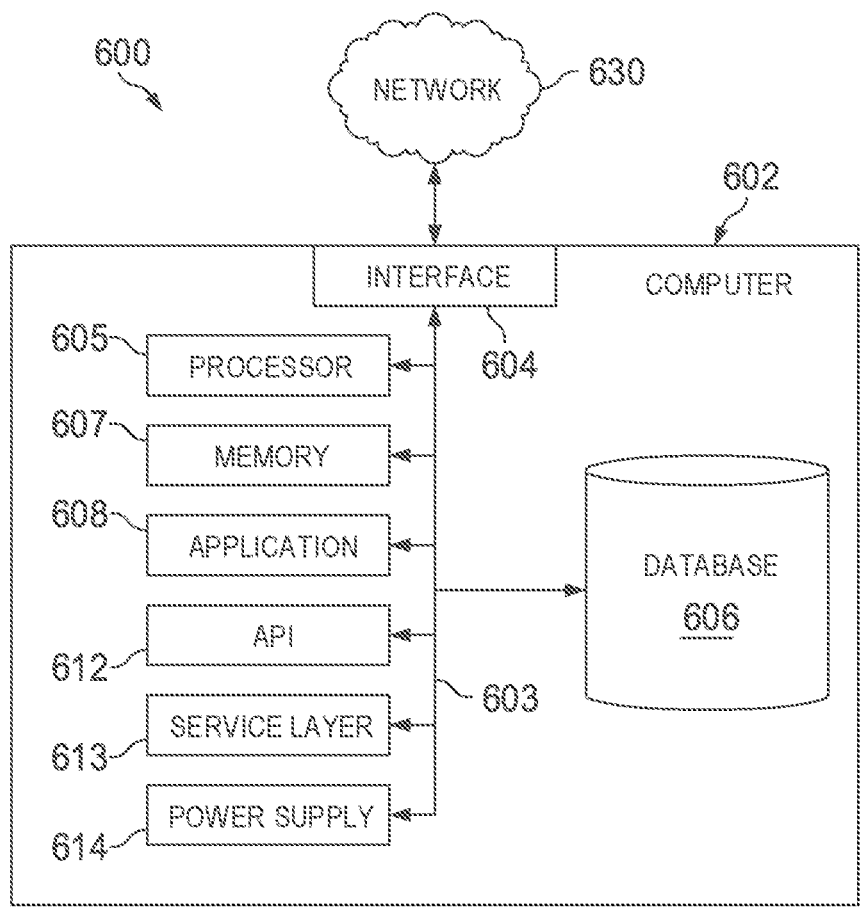
FIG. 6
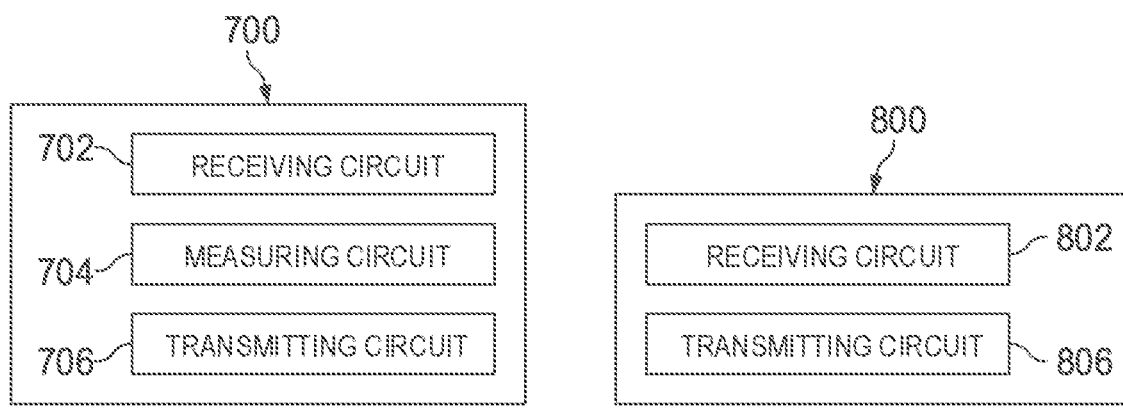
FIG. 7
FIG. 8

SIDELINK BEAM MANAGEMENT

CROSS-REFERENCE TO RELATED APPLICATIONS

This application is a continuation of International Application PCT/US2020/22414 filed on Mar. 12, 2020, which application is hereby incorporated herein by reference in its entirety.

TECHNICAL FIELD

This disclosure relates to sidelink beam reporting, particularly for beam reporting in 3rd Generation Partnership Project (3GPP) New Radio (NR) systems to support sidelink beam management.

BACKGROUND

In 3GPP NR systems, downlink beam management and uplink beam management are supported. A downlink refers to a link from a base station to a device. An uplink refers to a link from a device to a base station.

SUMMARY

The present disclosure describes sidelink beam reporting for device to device (D2D) communication.

In a first implementation, a method includes: receiving, by a first electronic device and from a base station, configuration of one or more beam management reference signals (BMRSs) on a sidelink between the first electronic device and a second electronic device and configuration of one or more sidelink random access channels (SL-RACHs); receiving and measuring, by the first electronic device and based on the received configuration of one or more BMRSs, a plurality of BMRSs transmitted by the second electronic device; and transmitting, by the first electronic device and based on the received configuration of one or more SL-RACHs, a SL-RACH to the second electronic device.

In a second implementation, a first electronic device includes: a non-transitory memory storage comprising instructions; and one or more hardware processors in communication with the memory storage, where the one or more hardware processors execute the instructions to perform operations comprising: receiving, from a base station, configuration of one or more beam management reference signals (BMRSs) on a sidelink between the first electronic device and a second electronic device and configuration of one or more sidelink random access channels (SL-RACHs); receiving and measuring, based on the received configuration of one or more BMRSs, a plurality of BMRSs transmitted by the second electronic device; and transmitting, based on the received configuration of one or more SL-RACHs, a SL-RACH to the second electronic device.

In a third implementation, a non-transitory computer-readable medium storing computer instructions for transmission beam control in a data communication, that when executed by one or more hardware processors, cause the one or more hardware processors to perform operations including: receiving, by a first electronic device and from a base station, configuration of one or more beam management reference signals (BMRSs) on a sidelink between the first electronic device and a second electronic device and configuration of one or more sidelink random access channels (SL-RACHs); receiving and measuring, by the first electronic device and based on the received configuration of one or more BMRSs, a plurality of BMRSs transmitted by the second electronic device; and transmitting, by the first electronic device and based on the received configuration of one or more SL-RACHs, a SL-RACH to the second electronic device.

In a fourth implementation, a method includes: receiving, by a first electronic device and from a base station, configuration of one or more beam management reference signals (BMRSs) on a sidelink between the first electronic device and a second electronic device and uplink feedback configuration; receiving, by the first electronic device and from the base station, first downlink control information (DCI); and in response to receiving the first DCI: receiving and measuring, by the first electronic device and based on the received configuration of one or more BMRSs, a plurality of BMRSs transmitted by the second electronic device; and transmitting, by the first electronic device and based on the received uplink feedback configuration, uplink feedback to the base station.

In a fifth implementation, a first electronic device includes: a non-transitory memory storage comprising instructions; and one or more hardware processors in communication with the memory storage, where the one or more hardware processors execute the instructions to perform operations comprising: receiving, from a base station, configuration of one or more beam management reference signals (BMRSs) on a sidelink between the first electronic device and a second electronic device and uplink feedback configuration; receiving, from the base station, first downlink control information (DCI); and in response to receiving the first DCI: receiving and measuring, based on the configuration of one or more BMRSs, a plurality of BMRSs transmitted by the second electronic device; and transmitting, based on the received uplink feedback configuration, uplink feedback to the base station.

In a sixth implementation, a non-transitory computer-readable medium storing computer instructions for transmission beam control in a data communication, that when executed by one or more hardware processors, cause the one or more hardware processors to perform operations including: receiving, by a first electronic device and from a base station, configuration of one or more beam management reference signals (BMRSs) on a sidelink between the first electronic device and a second electronic device and uplink feedback configuration; receiving, by the first electronic device and from the base station, first downlink control information (DCI); and in response to receiving the first DCI: receiving and measuring, by the first electronic device and based on the received configuration of one or more BMRSs, a plurality of BMRSs transmitted by the second electronic device; and transmitting, by the first electronic device and based on the received uplink feedback configuration, uplink feedback to the base station.

In a seventh implementation, a method includes: transmitting, by a base station and to a first electronic device, configuration of one or more beam management reference signals (BMRSs) on a sidelink between the first electronic device and a second electronic device and uplink feedback configuration; transmitting, by the base station and to the first electronic device, first downlink control information (DCI); transmitting, by the base station and to the second electronic device, second DCI; and receiving, by the base station and from the first electronic device, uplink feedback.

In an eighth implementation, a base station includes: a non-transitory memory storage comprising instructions; and one or more hardware processors in communication with the memory storage, where the one or more hardware processors execute the instructions to perform operations comprising: transmitting, to a first electronic device, configuration of one or more beam management reference signals (BMRSs) on a sidelink between the first electronic device and a second electronic device and uplink feedback configuration; transmitting, to the first electronic device, first downlink control information (DCI); transmitting, to the second electronic device, second DCI; and receiving, from the first electronic device, uplink feedback.

In a ninth implementation, a non-transitory computer-readable medium storing computer instructions for transmission beam control in a data communication, that when executed by one or more hardware processors, cause the one or more hardware processors to perform operations including: transmitting, by a base station and to a first electronic device, configuration of one or more beam management reference signals (BMRSs) on a sidelink between the first electronic device and a second electronic device and uplink feedback configuration; transmitting, by the base station and to the first electronic device, first downlink control information (DCI); transmitting, by the base station and to the second electronic device, second DCI; and receiving, by the base station and from the first electronic device, uplink feedback.

The previously described implementation is implementable using a method; a non-transitory, computer-readable medium storing computer-readable instructions to perform the method; and a computer-implemented system comprising a computer memory interoperably coupled with a hardware processor configured to perform the method and the instructions stored on the non-transitory, computer-readable medium.

The details of one or more implementations of the subject matter of this specification are set forth in the accompanying drawings and the description. Other features, aspects, and advantages of the subject matter will become apparent from the description, the drawings, and the claims.

BRIEF DESCRIPTION OF THE DRAWINGS

FIG. 6 is a block diagram of an example computer system used to provide computational functionalities associated with described algorithms, methods, functions, processes, flows, and procedures, as described in the instant disclosure, according to an implementation.

FIG. 7 is a schematic diagram illustrating an example structure of a terminal described in the present disclosure, according to an implementation.

FIG. 8 is a schematic diagram illustrating an example structure of a base station described in the present disclosure, according to an implementation.

Like reference numbers and designations in the various drawings indicate like elements.

DETAILED DESCRIPTION OF ILLUSTRATIVE EMBODIMENTS

Figure 1:
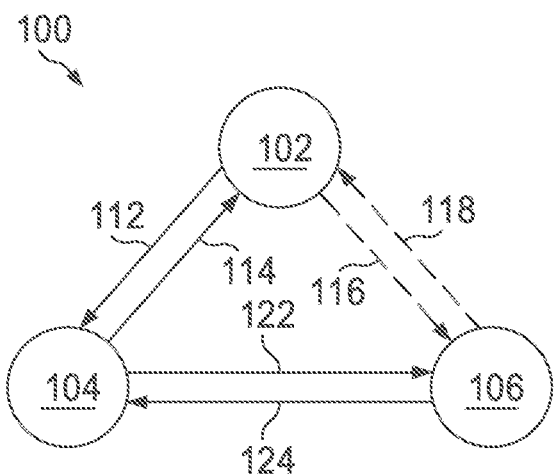
FIG. 1 is a block diagram illustrating sidelink beam reporting for device to device (D2D) communication, according to an implementation.

The following detailed description describes sidelink beam reporting for device to device (D2D) communication and is presented to enable any person skilled in the art to make and use the disclosed subject matter in the context of one or more particular implementations.

Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail inasmuch as such details are within the skill of one of ordinary skill in the art. The present disclosure is not intended to be limited to the described or illustrated implementations, but to be accorded the widest scope consistent with the described principles and features.

The 3rd Generation Partnership Project (3GPP) New Radio (NR) systems can support downlink beam management and uplink beam management. A downlink refers to a link from a base station to a device. An uplink refers to a link from a device to a base station. However, sidelink beam management (e.g., sidelink in millimeter wave frequency) is not supported in the current 3GPP NR systems. A sidelink can be defined for direct D2D communication without going through a base station (such as a 5G base station (gNB)).

Beam management reference signal (BMRS) can be used for sidelink beam management between a transmitting user equipment (TxUE) and a receiving UE (RxUE). BMRS can include, for example, sidelink synchronization signal block (SL-SSB) or one or more sidelink channel state information reference signals (SL-CSIRSs). BMRS can be transmitted, received, or both transmitted and received in a beam sweeping manner. When BMRS is beam-swept by a TxUE and measured by a RxUE at the same time, the RxUE needs to know how to report it's measurements of the TxUE's beam information.

The present disclosure describes example implementations of sidelink beam reporting for D2D communication. In the present disclosure, a first electronic device can receive, from a base station, configuration of SL-SSB (or SL-CSIRS) and configuration of sidelink random access channel (SL-RACH). The first electronic device then can measure SL-SSBs (or SL-CSIRSs) transmitted by a second electronic device, and transmit an SL-RACH to the second electronic device. In some implementations, the first electronic device can receive, from the base station, configuration of SL-CSIRS (or SL-SSB) and configuration of uplink feedback. The first electronic device can receive, from the base station, downlink control information (DCI). In response to receiving the DCI, the first electronic device can measure SL-CSIRSs (or SL-SSBs) transmitted by the second electronic device, and transmit uplink feedback to the base station.

FIG. 1 is a block diagram 100 illustrating sidelink beam reporting for device to device (D2D) communication, according to an implementation. The block diagram 100 includes a base station 102, user equipment (UE) 104, and UE 106. For example, the base station 102 can communicate with UE 104 through downlink 112 and uplink 114. UE 104 can communicate with UE 106 through forward sidelink 122 and reverse sidelink 124. If UE 106 is under coverage of the base station 102, the base station 102 can communicate with UE 106 through downlink 116 and uplink 118. In some implementations, additional, different, or fewer UEs can be included in a system as shown in FIG. 1, such that there can be multiple UEs acting either similar to UE 104 or UE 106.

As illustrated in FIG. 1, sidelink mode 1 is considered. In sidelink mode 1, a transmitting UE (TxUE), such as the UE 104, is under coverage of the base station 102. A receiving UE (RxUE), such as the UE 106, may or may not be under coverage of the base station 102. In some implementations, other sidelink modes can be considered in FIG. 1.

Figure 2:
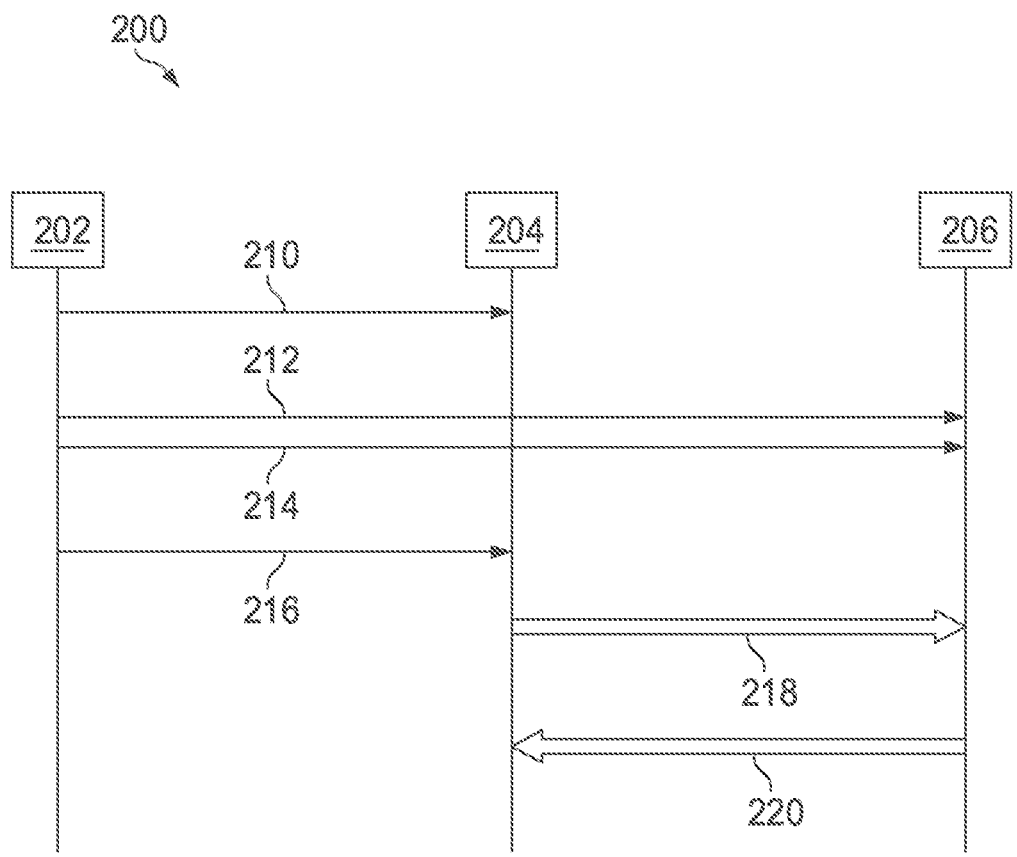
FIG. 2 is a swim diagram illustrating an example method for sidelink beam reporting for D2D communication, according to an implementation.

FIG. 2 is a swim diagram illustrating an example method 200 for sidelink beam reporting for D2D communication, according to an implementation. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

As illustrated in FIG. 2, a UE 204 is under coverage of a base station 202. A UE 206 may or may not be under coverage of the base station 202. The UE 204 can perform sidelink beam management with the UE 206. For example, the UE 204 can transmit SL-SSB to the UE 206 on forward sidelink. In some implementations, the UE 204 can transmit SL-CSIRS to the UE 206 on the forward sidelink instead of or in addition to the SL-SSB. In general, it should be understood throughout this application that a SL-CSIRS can be used in the same manner as a SL-SSB (or the reverse). Similarly, the SL-SSBs and SL-CSIRSs can optionally be used together, simultaneously.

At 210, the base station 202 can transmit configuration of SL-SSB (or SL-CSIRS) to the UE 204. For example, the base station 202 can transmit the configuration of SL-SSB (or SL-CSIRS) to the UE 204 on a downlink between the base station 202 and the UE 204 (e.g., the downlink 112 in FIG. 1). In some implementations, the SL-SSB (or SL-CSIRS) can be used for sidelink beam management on a sidelink between the UE 204 and the UE 206.

At 212, the base station 202 can transmit the configuration of SL-SSB (or SL-CSIRS) to the UE 206. For example, when the UE 206 is under coverage of the base station 202, the base station 202 can transmit the configuration of SL-SSB (or SL-CSIRS) to the UE 206 on a downlink between the base station 202 and the UE 206 (e.g., the downlink 116 in FIG. 1). In some implementations, when the UE 206 is outside the coverage of the base station 202, the UE 204 can forward the configuration of SL-SSB (or SL-CSIRS) to the UE 206 on a forward sidelink between the UE 204 and the UE 206 (e.g., the forward sidelink 122 in FIG. 1), such that the UE 206 receives the configuration from the base station 202 through the UE 204.

At 214, the base station 202 can transmit configuration of SL-RACH to the UE 206. For example, when the UE 206 is under coverage of the base station 202, the base station 202 can transmit the configuration of SL-RACH to the UE 206 on the downlink between the base station 202 and the UE 206. In some implementations, when the UE 206 is outside the coverage of the base station 202, the UE 204 can forward the configuration of SL-RACH to the UE 206 on the forward sidelink between the UE 204 and the UE 206. In some implementations, the SL-RACH can be used to allow the UE 206 to initiate sidelink access to the UE 204. The configuration of SL-RACH can be used to configure random access on the sidelink between the UE 204 and the UE 206.

At 216, the base station 202 can transmit the configuration of SL-RACH to the UE 204. For example, the base station 202 can transmit the configuration of SL-RACH to the UE 204 on the downlink between the base station 202 and the UE 204.

In some implementations, the SL-SSB (or SL-CSIRS) and the SL-RACH can be pre-configured. For example, the UE 204 and the UE 206 can be pre-configured with information of the SL-SSB (or SL-CSIRS) and the SL-RACH. In other words, the base station 202 does not need to transmit the configuration of SL-SSB (or SL-CSIRS) and the configuration of SL-RACH to the UE 204 and the UE 206, and steps 210-216 can be omitted from the method 200.

At 218, the UE 204 can transmit multiple SL-SSBs (or SL-CSIRSs) to the UE 206. For example, the UE 204 can transmit the multiple SL-SSBs (or SL-CSIRSs) to the UE 206 on the forward sidelink based on the configuration of SL-SSB (or SL-CSIRS). At the same time, the UE 206 can measure the multiple SL-SSBs (or SL-CSIRSs) transmitted by the UE 204 based on the configuration of SL-SSB (or SL-CSIRS).

At 220, the UE 206 can transmit a particular SL-RACH from multiple SL-RACHs to the UE 204. For example, the UE 206 can transmit the particular SL-RACH to the UE 204 on a reverse sidelink between the UE 204 and the UE 206 (e.g., the reverse sidelink 124 in FIG. 1) based on the configuration of SL-RACH. At the same time, the UE 204 can measure the particular SL-RACH transmitted by the UE 206 based on the configuration of SL-RACH. In some implementations, the UE 206 can transmit sidelink feedback to the UE 204. The sidelink feedback can include UE 206's measurements of the multiple SL-SSBs (or SL-CSIRSs).

In some implementations, each SL-SSB (or SL-CSIRS) of the multiple SL-SSBs (or SL-CSIRSs) can be associated with a plurality of different transmit beam pattern. Each SL-RACH of the multiple SL-RACHs can be associated with a plurality of different receive beam pattern. Each SL-SSB (or SL-CSIRS) can correspond to a different SL-RACH. In some implementations, each SL-SSB (or SL-CSIR) transmit beam pattern can correspond to a different SL-RACH receive beam pattern. For example, at least one of the transmit beam pattern association, the receive beam pattern association, or the correspondence can be included in at least one of the configuration of SL-SSB (or SL-CSIRS), or the configuration of SL-RACH. In some implementations, at least one of the transmit beam pattern association, the receive beam pattern association, or the correspondence can be pre-configured or transmitted by the base station 202 or the UE 204 to the UE 206.

In some implementations, the UE 206 can monitor N SL-SSBs, and determine that the $n^{th}$ SL-SSB is the best SL-SSB among the N SL-SSBs. N is an integer greater than 1, and $1 \leq n \leq N$. The UE 206 then can transmit an SL-RACH on the $n^{th}$ SL-RACH resource, which can be associated with the $n^{th}$ SL-SSB. At the same time, the UE 204 can monitor N SL-RACH resources. If the UE 204 detects the $n^{th}$ SL-RACH, the UE 204 can determine that the $n^{th}$ SL-SSB is the best SL-SSB among the N SL-SSBs. In some implementations, a detailed beam report (e.g., beam qualities measured in reference signal receive power (RSRP)) can be transmitted in a next message (e.g., Message 3) following the particular SL-RACH transmission (i.e., step 220) on the reverse sidelink. SL-RACH can be used when the UE 206 is outside coverage of the base station 202, or when the UE 206 is under coverage of the base station 202 but not in a CONNECTED mode (or state).

In some implementations, SL-RACH can have a different format than Uplink Physical Random Access Channel (UL-PRACH). For example, SL-RACH and UL-PRACH can have different delay spread. SL-RACH can be used when there are more than one RxUEs trying to connect to a same TxUE. In some implementations, feedback channels, such as Physical Sidelink Feedback Channel (PSFCH), Physical Sidelink Shared Channel (PSSCH), and Physical Sidelink Control Channel (PSCCH), can be used instead of SL-RACH. In such cases, the detailed beam report can be carried by PSFCH/PSSCH/PSCCH directly. In other words, there is no need for a next message (e.g., Message 3), thereby resulting in small latency. However, the feedback channels cannot be used when there are more than one RxUEs trying to access to a same TxUE at the same time.

In some implementations, the base station 202 or the UE 204 can establish (or configure) an association between different beams of CSIRS and different feedback channels. For example, the UE 206 can monitor N SL-CSIRSs, and determine that the $n^{th}$ SL-CSIRS is the best SL-CSIRS among the N CSIRSs. N is an integer greater than 1, and $1 \leq n \leq N$. The UE 206 then can transmit feedback channel on the $n^{th}$ sidelink feedback resource. At the same time, the UE 204 can monitor N sidelink feedback resources. If the UE 204 detects the $n^{th}$ sidelink feedback, the UE 204 can determine that the $n^{th}$ SL-CSIRS is the best SL-CSIRS among the N SL-CSIRSs. In some implementations, beam information can be carried in the feedback channel explicitly.

Figure 3:
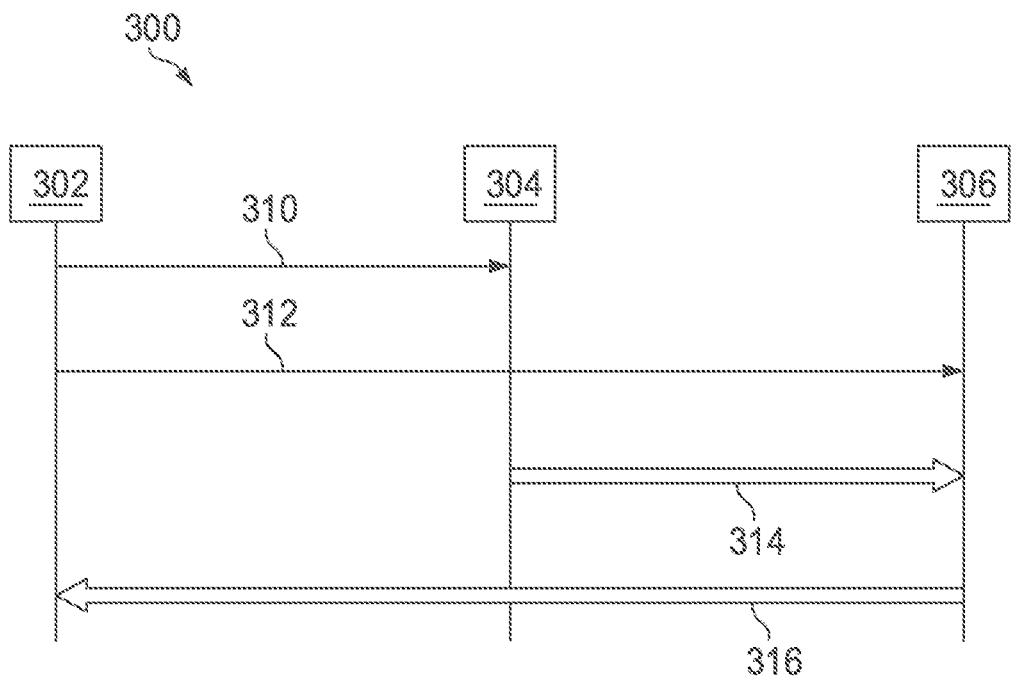
FIG. 3 is a swim diagram illustrating another example method for sidelink beam reporting for D2D communication, according to an implementation.

FIG. 3 is a swim diagram illustrating another example method 300 for sidelink beam reporting for D2D communication, according to an implementation. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

As illustrated in FIG. 3, a UE 304 is under coverage of a base station 302. A UE 306 is also under coverage of the base station 302. The UE 304 can perform sidelink beam management with the UE 306. For example, the UE 304 can transmit SL-CSIRS to the UE 306 on forward sidelink. In some implementations, the UE 304 can transmit SL-SSB to the UE 306 on the forward sidelink. As discussed regarding FIG. 2, the SL-SSBs and the SL-CSIRSs can be used interchangeably.

During a configuration or preparation phase (not shown in FIG. 3), the base station 302 can transmit configuration of SL-CSIRS to the UE 304 and the UE 306. For example, the base station 302 can transmit the configuration of SL-CSIRS to the UE 304 on a downlink between the base station 302 and the UE 304 (e.g., the downlink 112 in FIG. 1). The base station 302 can transmit the configuration of SL-CSIRS to the UE 306 on a downlink between the base station 302 and the UE 306 (e.g., the downlink 116 in FIG. 1). In some implementations, the configuration of SL-CSIRS can be broadcasted by the base station 302. In some implementations, the configuration of SL-CSIRS can be transmitted using, for example, Radio Resource Control (RRC) or Media Access Control Control Element (MAC-CE). In some implementations, the SL-CSIRS can be pre-configured.

The base station 302 can transmit configuration of uplink feedback (UL-FDBK) to the UE 304 and the UE 306. For example, the base station 302 can transmit the configuration of UL-FDBK to the UE 304 on the downlink between the base station 302 and the UE 304. The base station 302 can transmit the configuration of UL-FDBK to the UE 306 on the downlink between the base station 302 and the UE 306. In some implementations, the configuration of UL-FDBK can be broadcasted by the base station 302. In some implementations, the configuration of UL-FDBK can be transmitted using, for example, RRC or MAC-CE. In some implementations, the UL-FDBK can be pre-configured. The configuration of UL-FDBK can be used to configure access on an uplink between the base station 302 and the UE 204. The configuration of UL-FDBK can be used to configure access on an uplink between the base station 302 and the UE 206.

During a downlink control information (DCI) triggering phase, steps 310 and 312 are performed. At 310, the base station 302 can transmit first DCI (DCI 1) to the UE 304. The DCI 1 can trigger the UE 304 to transmit SL-CSIRS. For example, the base station 302 can transmit the DCI 1 to the UE 304 on the downlink between the base station 302 and the UE 304. The DCI 1 can instruct the UE 304 to transmit SL-CSIRS.

In some implementations, the DCI 1 can be used to schedule a TxUE to transmit reference signal. For example, the DCI 1 can include at least one of a field indicating CSIRS beam pattern, a field indicating time resource for the reference signal transmission, or a field indicating frequency resource for the reference signal transmission.

At 312, the base station 302 can transmit second DCI (DCI 2) to the UE 306. The DCI 2 can trigger the UE 306 to measure SL-CSIRS and report measurements. For example, the base station 302 can transmit the DCI 2 to the UE 306 on the downlink between the base station 302 and the UE 306. The DCI 2 can instruct the UE 306 to measure SL-CSIRS transmitted by the UE 304 and to report measurements on the uplink between the base station 302 and the UE 206. In some implementations, instead of the base station transmitting the DCI 2 to the UE 306, the UE 304 can transmit a sidelink control information (SCI) to the UE 306. The SCI can instruct the UE 306 to measure SL-CSIRS and report UL-FDBK.

In some implementations, the DCI 2 can be used to schedule a RxUE to measure reference signals and perform beam reporting. For example, the DCI 2 can include at least one of a field indicating CSIRS beam pattern, a field indicating that the reference signal is transmitted on a sidelink or a downlink, a field indicating time resource for the reference signal transmission, a field indicating frequency resource for the reference signal transmission, a field indicating time resource for an uplink report, or a field indicating frequency resource for the uplink report.

During a measuring and reporting phase, steps 314 and 316 are performed. At 314, the UE 304 can transmit multiple SL-CSIRSs to the UE 306. For example, the UE 304 can transmit the multiple SL-CSIRSs to the UE 306 on a forward sidelink between the UE 304 and the UE 306 based on the configuration of SL-CSIRS. At the same time, the UE 306 can measure the multiple SL-CSIRSs transmitted by the UE 304 based on the configuration of SL-CSIRS.

At 316, the UE 306 can transmit uplink feedback to the base station 302. For example, the UE 306 can transmit uplink feedback to the base station 302 on a Physical Uplink Shared Channel (PUSCH) or a Physical Uplink Control Channel (PUCCH) based on the configuration of UL-FDBK.

At the same time, the base station 302 can receive the uplink feedback from the UE 306, and determine the best SL-CSIRS beam information from the uplink feedback. In some implementations, the base station 302 can transmit the best SL-CSIRS beam information to the UE 304.

In some implementations, the base station 302 can be aware of sidelink measurement information between the UE 304 and the UE 306. However, uplink control can be required between the UE 306 and the base station 302.

In some implementations, the base station 302 can measure the multiple SL-CSIRSs transmitted by the UE 304 as well. With the uplink feedback from the UE 306 and the base station 302's measurements, the base station 302 can make a better-informed decision on resource allocation or beam management.

Figure 4:
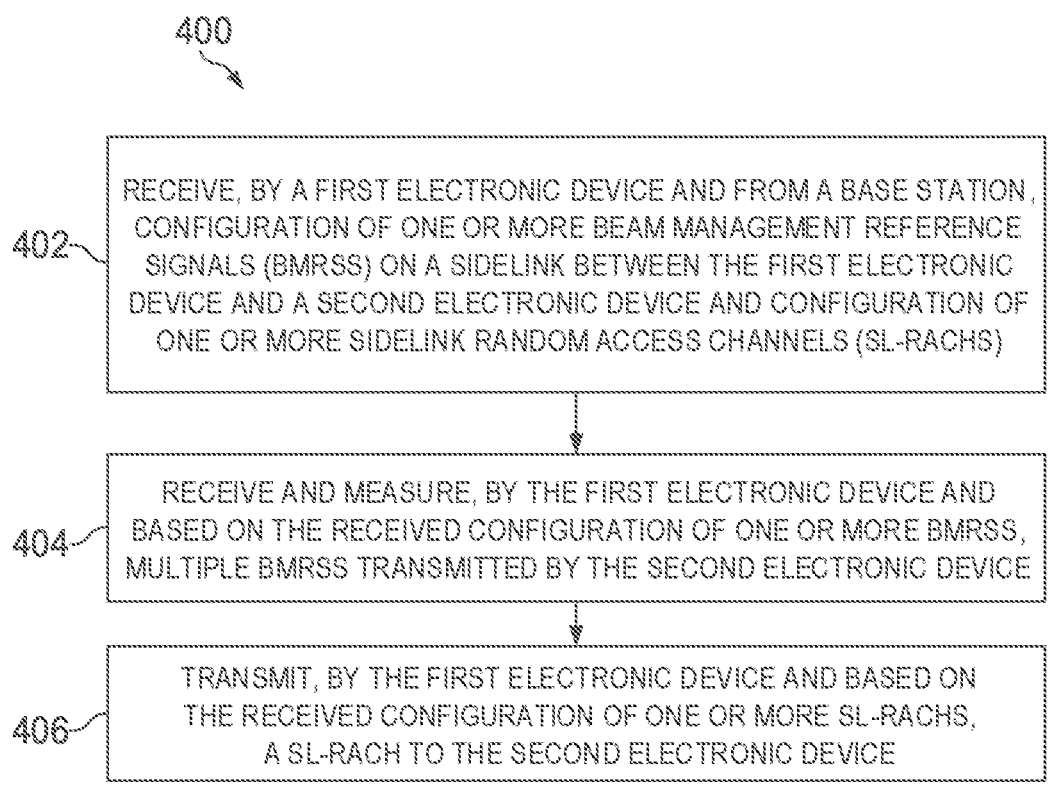
FIG. 4 is a flow diagram illustrating an example method for sidelink beam reporting for D2D communication, according to an implementation.

FIG. 4 is a flow diagram illustrating an example method 400 for sidelink beam reporting for D2D communication, according to an implementation. For clarity of presentation, the description that follows generally describes method 400 in the context of the other figures in this description. The method 400 can be implemented by an electronic device, e.g., the UE 204 illustrated in FIG. 2. However, it will be understood that the method 400 may be performed, for example, by any suitable system, environment, software, and hardware, or a combination of systems, environments, software, and hardware, as appropriate. In some implementations, various steps of the method 400 can be run in parallel, in combination, in loops, or in any order.

The method 400 begins at 402, where a first electronic device receives, from a base station, configuration of one or more beam management reference signals (BMRSs) on a sidelink between the first electronic device and a second electronic device and configuration of one or more sidelink random access channels (SL-RACHs). The base station can include a 5G base station (gNB) or a 5G-capable base station. The first and second electronic devices can communicate through a sidelink.

In some implementations, the first electronic device and the second electronic device are within coverage of the base station, and the first electronic device receives the configuration of one or more BMRSs and the configuration of one or more SL-RACHs directly from the base station (e.g., signal transmitted by the base station can be heard by the first electronic device). In some implementations, the first electronic device is outside coverage of the base station, the second electronic device is within coverage of the base station, and the first electronic device receives the configuration of one or more BMRSs and the configuration of one or more SL-RACHs from the base station through the second electronic device.

At 404, the first electronic device receives and measures, based on the received configuration of one or more BMRSs, a plurality of SL-SSBs transmitted by the second electronic device. In some implementations, the one or more BMRSs can include at least one of one or more sidelink synchronization signal blocks (SL-SSBs) or one or more sidelink channel state information reference signals (SL-CSIRSs).

At 406, the first electronic device transmits, based on the received configuration of one or more SL-RACHs, a SL-RACH to the second electronic device. For example, the first electronic device can determine, based on the measured plurality of BMRSs, a best BMRS from the plurality of BMRSs. The transmitted SL-RACH is associated with the best BMRS. In some implementations, the first electronic device can generate a beam report based on the measured plurality of BMRSs. The beam report can include reference signal receive powers (RSRP) of a plurality of beam patterns associated with the plurality of BMRSs. The first electronic device can transmit the generated beam report to the second electronic device.

Figure 5:
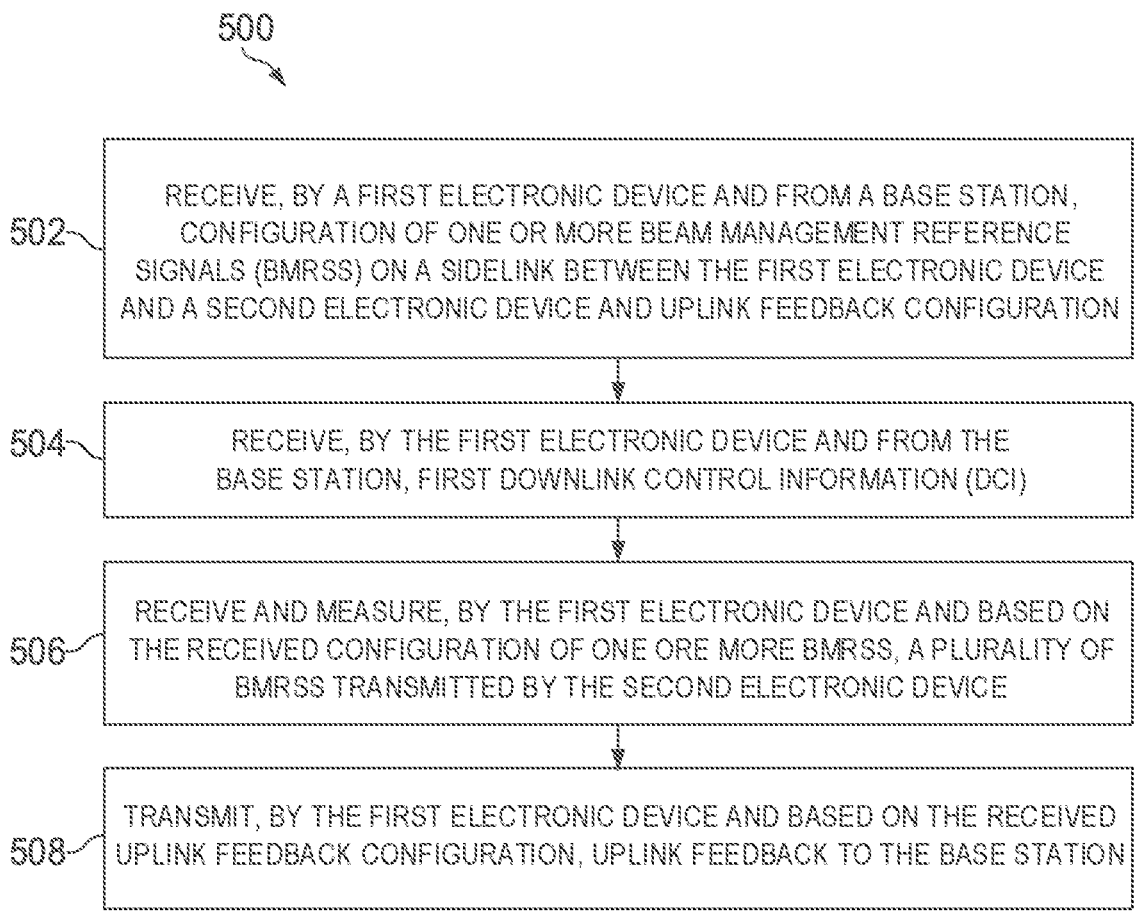
FIG. 5 is a flow diagram illustrating another example method for sidelink beam reporting for D2D communication, according to an implementation.

FIG. 5 is a flow diagram illustrating an example method 500 for sidelink beam reporting for D2D communication, according to an implementation. For clarity of presentation, the description that follows generally describes method 500 in the context of the other figures in this description. The method 500 can be implemented by an electronic device, e.g., the UE 304 illustrated in FIG. 3. However, it will be understood that the method 500 may be performed, for example, by any suitable system, environment, software, and hardware, or a combination of systems, environments, software, and hardware, as appropriate. In some implementations, various steps of the method 500 can be run in parallel, in combination, in loops, or in any order.

The method 500 begins at 502, where a first electronic device receives, from a base station, configuration of one or more beam management reference signals (BMRSs) on a sidelink between the first electronic device and a second electronic device and uplink feedback configuration. The base station can include a 5G base station (gNB) a 5G-capable base station. The first and second electronic devices can communicate through a sidelink.

In some implementations, the first electronic device and the second electronic device are within coverage of the base station. The first electronic device can receive the configuration of one or more BMRSs and the uplink feedback configuration directly from the base station. For example, the first electronic device does not need the second electronic device to forward the configuration of one or more BMRSs and the uplink feedback configuration.

At 504, the first electronic device receives, from the base station, first downlink control information (DCI). In some implementations, the one or more BMRSs can include sidelink channel state information reference signal (SL-CSIRS). The first DCI can include at least one of a field indicating CSIRS beam pattern, a field indicating CSIRS transmission on a sidelink or a downlink, a field indicating time resource for CSIRS transmission, a field indicating frequency resource for CSIRS transmission, a field indicating time resource for uplink report, or a field indicating frequency resource for uplink report.

In response to receiving the first DCI, at 506, the first electronic device receives and measures, based on the received configuration of one or more BMRSs, a plurality of BMRSs transmitted by the second electronic device. For example, the first DCI can be used to instruct the first electronic device to measure the plurality of BMRSs and transmit a beam report based on the measured plurality of BMRSs to the base station.

In some implementations, the base station can transmit second DCI to the second electronic device. The second DCI can be used to instruct the second electronic device to transmit the plurality of BMRSs. In some implementations, the one or more BMRSs can include SL-CSIRS. The second DCI can include at least one of a field indicating CSIRS beam pattern, a field indicating time resource for CSIRS transmission, or a field indicating frequency resource for CSIRS transmission.

At 508, the first electronic device transmits, based on the received uplink feedback configuration, uplink feedback to the base station. The first electronic device can transmit the uplink feedback to the base station using a Physical Uplink Control Channel (PUCCH) or a Physical Uplink Shared Channel (PUSCH). In some implementations, the base station can determine a best beam pattern (e.g., a best CSIRS beam pattern) based on the received uplink feedback from the first electronic device. The base station can transmit the best beam pattern to the second electronic device.

FIG. 6 is a block diagram of an example computer system 600 used to provide computational functionalities associated with described algorithms, methods, functions, processes, flows, and procedures, as described in the instant disclosure, according to an implementation. The computer system 600, or more than one computer system 600, can be used to implement the electronic device described previously in this disclosure, e.g., the UE 206 illustrated in FIG. 2.

In some aspects, the computer 602 may comprise a computer that includes an input device, such as a keypad, keyboard, touch screen, or other device that can accept user information, and an output device that conveys information associated with the operation of the computer 602, including digital data, visual, or audio information (or a combination of information), or a graphical user interface (GUI).

The computer 602 can serve in a role as a client, network component, a server, a database or other persistence, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, global, or other environments (or a combination of environments).

At a high level, the computer 602 is an electronic computing device operable to receive, transmit, process, store, or manage data and information associated with the described subject matter. According to some implementations, the computer 602 may also include, or be communicably coupled with, an application server, e-mail server, web server, caching server, streaming data server, or other servers (or a combination of servers).

The computer 602 can receive requests over network 630 from a client application (for example, executing on another computer 602) and respond to the received requests by processing the received requests using an appropriate software application(s). In addition, requests may also be sent to the computer 602 from internal users (for example, from a command console or by other appropriate access methods), external or third-parties, other automated applications, as well as any other appropriate entities, individuals, systems, or computers.

Each of the components of the computer 602 can communicate using a system bus 603. In some implementations, any or all of the components of the computer 602, hardware or software (or a combination of both hardware and software), may interface with each other or the interface 604 (or a combination of both), over the system bus 603 using an application programming interface (API) 612 or a service layer 613 (or a combination of the API 612 and service layer 613). The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined functionalities through a defined interface. For example, the interface may be software written in JAVA, C++, or other suitable language providing data in extensible markup language (XML) format or other suitable formats. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems that are connected to the network 630 (whether illustrated or not) in a distributed environment. Generally, the interface 604 includes logic encoded in software or hardware (or a combination of software and hardware) and is operable to communicate with the network 630. More specifically, the interface 604 may include software supporting one or more communication protocols associated with communication such that the network 630 or interface's hardware is operable to communicate physical signals within and outside of the illustrated computer 602.

The computer 602 includes a processor 605. Although illustrated as a single processor 605 in FIG. 6, two or more processors may be used according to particular needs, desires, or particular implementations of the computer 602. Generally, the processor 605 executes instructions and manipulates data to perform the operations of the computer 602 and any algorithms, methods, functions, processes, flows, and procedures as described in the instant disclosure.

The computer 602 also includes a database 606 that can hold data for the computer 602 or other components (or a combination of both) that can be connected to the network 630 (whether illustrated or not). For example, database 606 can be an in-memory, conventional, or other types of database storing data consistent with this disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases (of the same or combination of types) can be used according to particular needs, desires, or particular implementations of the computer 602 and the described functionality. While database 606 is illustrated as an integral component of the computer 602, in alternative implementations, database 606 can be external to the computer 602.

The computer 602 also includes a memory 607 that can hold data for the computer 602 or other components (or a combination of both) that can be connected to the network 630 (whether illustrated or not). For example, memory 607 can be Random Access Memory (RAM), Read-Only Memory (ROM), optical, magnetic, and the like, storing data consistent with this disclosure. In some implementations, memory 607 can be a combination of two or more different types of memory (for example, a combination of RAM and magnetic storage) according to particular needs, desires, or particular implementations of the computer 602 and the described functionality. Although illustrated as a single memory 607 in FIG. 6, two or more memories 607 (of the same or a combination of types) can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to the functionality described in this disclosure. For example, application 608 can serve as one or more components, modules, or applications. Further, although illustrated as a single application 608, the application 608 may be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or other power management functionality). In some implementations, the power supply 614 can include a power plug to allow the computer 602 to be plugged into a wall socket or other power source to, for example, power the computer 602 or recharge a rechargeable battery.

There may be any number of computers 602 associated with, or external to, a computer system containing computer 602, each computer 602 communicating over network 630. Further, the term "client," "user," and other appropriate terminology may be used interchangeably, as appropriate, without departing from the scope of this disclosure. Moreover, this disclosure contemplates that many users may use one computer 602, or that one user may use multiple computers 602.

FIG. 7 is a schematic diagram illustrating an example structure of a terminal 700 described in the present disclosure, according to an implementation. The terminal 700 includes a receiving circuit 702, a measuring circuit 704, and a transmitting circuit 706. In some implementations, terminal 700 can further include one or more circuits for performing any one or a combination of steps described in the present disclosure.

The receiving circuit 702 is configured to receive, from a base station, configuration of one or more beam management reference signals (BMRSs) on a sidelink between the terminal and a second terminal and configuration of one or more sidelink random access channels (SL-RACHs).

The measuring circuit 704 is configured to measure, based on the configuration of one or more BMRSs, a plurality of BMRSs transmitted by the second terminal.

The transmitting circuit 706 is configured to transmit, based on the received configuration of one or more SL-RACHs, a SL-RACH to the second terminal.

FIG. 8 is a schematic diagram illustrating an example structure of a base station 800 described in the present disclosure, according to an implementation. The base station 800 includes a receiving circuit 802, and a transmitting circuit 806. In some implementations, the base station 800 can further include one or more circuits for performing any one or a combination of steps described in the present disclosure.

The receiving circuit 802 is configured to receive uplink feedback from a terminal.

The transmitting circuit 806 is configured to transmit configuration of one or more beam management reference signals (BMRSs) on a sidelink between the terminal and a second terminal and uplink feedback configuration to the terminal.

Described implementations of the subject matter can include one or more features, alone or in combination.

In a first implementation, a computer-implemented includes: receiving, by a first electronic device and from a base station, configuration of one or more beam management reference signals (BMRSs) on a sidelink between the first electronic device and a second electronic device and configuration of one or more sidelink random access channels (SL-RACHs); receiving and measuring, by the first electronic device and based on the received configuration of one or more BMRSs, a plurality of BMRSs transmitted by the second electronic device; and transmitting, by the first electronic device and based on the received configuration of one or more SL-RACHs, a SL-RACH to the second electronic device.

The foregoing and other described implementations can each, optionally, include one or more of the following features:

A first feature, combinable with any of the following features, where the first electronic device and the second electronic device are within coverage of the base station, and the first electronic device receives the configuration of one or more BMRSs and the configuration of one or more SL-RACHs directly from the base station.

A second feature, combinable with any of the previous or following features, where the first electronic device is outside coverage of the base station, the second electronic device is within coverage of the base station, and the first electronic device receives the configuration of one or more BMRSs and the configuration of one or more SL-RACHs from the base station through the second electronic device.

A third feature, combinable with any of the previous or following features, where the one or more BMRSs includes at least one of one or more sidelink synchronization signal blocks (SL-SSBs) or one or more sidelink channel state information reference signals (SL-CSIRSs).

A fourth feature, combinable with any of the previous or following features, the method further comprising: determining, by the first electronic device and based on the measured plurality of BMRSs, a best BMRS from the plurality of BMRSs, where the transmitted SL-RACH is associated with the best BMRS.

A fifth feature, combinable with any of the previous or following features, the method further comprising: generating, by the first electronic device, a beam report based on the measured plurality of BMRSs, where the beam report includes reference signal receive powers (RSRP) of a plurality of beam patterns associated with the plurality of BMRSs; and transmitting, by the first electronic device, the generated beam report to the second electronic device.

A sixth feature, combinable with any of the previous or following features, where the base station includes a 5G-capable base station, and the first and second electronic devices communicate through a sidelink.

In a second implementation, a first electronic device includes: a non-transitory memory storage comprising instructions; and one or more hardware processors in communication with the memory storage, where the one or more hardware processors execute the instructions to perform operations comprising: receiving, from a base station, configuration of one or more beam management reference signals (BMRSs) on a sidelink between the first electronic device and a second electronic device and configuration of one or more sidelink random access channels (SL-RACHs);

receiving and measuring, based on the received configuration of one or more BMRSs, a plurality of BMRSs transmitted by the second electronic device; and transmitting, based on the received configuration of one or more SL-RACHs, a SL-RACH to the second electronic device.

The foregoing and other described implementations can each, optionally, include one or more of the following features:

A first feature, combinable with any of the following features, where the first electronic device and the second electronic device are within coverage of the base station, and the first electronic device receives the configuration of one or more BMRSs and the configuration of one or more SL-RACHs directly from the base station.

A second feature, combinable with any of the previous or following features, where the first electronic device is outside coverage of the base station, the second electronic device is within coverage of the base station, and the first electronic device receives the configuration of one or more BMRSs and the configuration of one or more SL-RACHs from the base station through the second electronic device.

A third feature, combinable with any of the previous or following features, where the one or more BMRSs includes at least one of one or more sidelink synchronization signal blocks (SL-SSBs) or one or more sidelink channel state information reference signals (SL-CSIRSs).

A fourth feature, combinable with any of the previous or following features, the operations further comprising: determining, based on the measured plurality of BMRSs, a best BMRS from the plurality of BMRSs, where the transmitted SL-RACH is associated with the best BMRS.

A fifth feature, combinable with any of the previous or following features, the operations further comprising: generating a beam report based on the measured plurality of BMRSs, where the beam report includes reference signal receive powers (RSRP) of a plurality of beam patterns associated with the plurality of BMRSs; and transmitting the generated beam report to the second electronic device.

A sixth feature, combinable with any of the previous or following features, where the base station includes a 5G-capable base station, and the first and second electronic devices communicate through a sidelink.

In a third implementation, a non-transitory computer-readable medium storing computer instructions for transmission beam control in a data communication, that when executed by one or more hardware processors, cause the one or more hardware processors to perform operations comprising: receiving, by a first electronic device and from a base station, configuration of one or more beam management reference signals (BMRSs) on a sidelink between the first electronic device and a second electronic device and configuration of one or more sidelink random access channels (SL-RACHs); receiving and measuring, by the first electronic device and based on the received configuration of one or more BMRSs, a plurality of BMRSs transmitted by the second electronic device; and transmitting, by the first electronic device and based on the received configuration of one or more SL-RACHs, a SL-RACH to the second electronic device.

The foregoing and other described implementations can each, optionally, include one or more of the following features:

A first feature, combinable with any of the following features, where the first electronic device and the second electronic device are within coverage of the base station, and the first electronic device receives the configuration of one or more BMRSs and the configuration of one or more SL-RACHs directly from the base station.

A second feature, combinable with any of the previous or following features, where the first electronic device is outside coverage of the base station, the second electronic device is within coverage of the base station, and the first electronic device receives the configuration of one or more BMRSs and the configuration of one or more SL-RACHs from the base station through the second electronic device.

A third feature, combinable with any of the previous or following features, where the one or more BMRSs includes at least one of one or more sidelink synchronization signal blocks (SL-SSBs) or one or more sidelink channel state information reference signals (SL-CSIRSs).

A fourth feature, combinable with any of the previous or following features, the operations further comprising: determining, by the first electronic device and based on the measured plurality of BMRSs, a best BMRS from the plurality of BMRSs, where the transmitted SL-RACH is associated with the best BMRS.

A fifth feature, combinable with any of the previous or following features, the operations further comprising: generating, by the first electronic device, a beam report based on the measured plurality of BMRSs, where the beam report includes reference signal receive powers (RSRP) of a plurality of beam patterns associated with the plurality of BMRSs; and transmitting, by the first electronic device, the generated beam report to the second electronic device.

A sixth feature, combinable with any of the previous or following features, where the base station includes a 5G-capable base station, and the first and second electronic devices communicate through a sidelink.

In a fourth implementation, a computer-implemented includes: receiving, by a first electronic device and from a base station, configuration of one or more beam management reference signals (BMRSs) on a sidelink between the first electronic device and a second electronic device and uplink feedback configuration; receiving, by the first electronic device and from the base station, first downlink control information (DCI); and in response to receiving the first DCI: receiving and measuring, by the first electronic device and based on the received configuration of one or more BMRSs, a plurality of BMRSs transmitted by the second electronic device; and transmitting, by the first electronic device and based on the received uplink feedback configuration, uplink feedback to the base station.

The foregoing and other described implementations can each, optionally, include one or more of the following features:

A first feature, combinable with any of the following features, where the first electronic device and the second electronic device are within coverage of the base station, and the first electronic device receives the configuration of one or more BMRSs and the uplink feedback configuration directly from the base station.

A second feature, combinable with any of the previous or following features, where the one or more BMRSs includes sidelink channel state information reference signal (SL-CSIRS), the first DCI is used to instruct the first electronic device to measure a plurality of SL-CSIRSs and transmit a beam report based on the measured plurality of SL-CSIRSs to the base station, and the first DCI includes a field indicating CSIRS beam pattern, a field indicating CSIRS transmission on a sidelink or a downlink, a field indicating time resource for CSIRS transmission, a field indicating frequency resource for CSIRS transmission, a field indicating time resource for uplink report, and a field indicating frequency resource for uplink report.

A third feature, combinable with any of the previous or following features, where the first electronic device transmits the uplink feedback to the base station using a Physical Uplink Control Channel (PUCCH) or a Physical Uplink Shared Channel (PUSCH).

A fourth feature, combinable with any of the previous or following features, where the base station includes a 5G-capable base station, and the first and second electronic devices communicate through a sidelink.

In a fifth implementation, a first electronic device includes: a non-transitory memory storage comprising instructions; and one or more hardware processors in communication with the memory storage, where the one or more hardware processors execute the instructions to perform operations comprising: receiving, from a base station, configuration of one or more beam management reference signals (BMRSs) on a sidelink between the first electronic device and a second electronic device and uplink feedback configuration; receiving, from the base station, first downlink control information (DCI); and in response to receiving the first DCI: receiving and measuring, based on the configuration of one or more BMRSs, a plurality of BMRSs transmitted by the second electronic device; and transmitting, based on the received uplink feedback configuration, uplink feedback to the base station.

The foregoing and other described implementations can each, optionally, include one or more of the following features:

A first feature, combinable with any of the following features, where the first electronic device and the second electronic device are within coverage of the base station, and the first electronic device receives the configuration of one or more BMRSs and the uplink feedback configuration directly from the base station.

A second feature, combinable with any of the previous or following features, where the one or more BMRSs includes sidelink channel state information reference signal (SL-CSIRS), the first DCI is used to instruct the first electronic device to measure a plurality of SL-CSIRSs and transmit a beam report based on the measured plurality of SL-CSIRSs to the base station, and the first DCI includes a field indicating CSIRS beam pattern, a field indicating CSIRS transmission on a sidelink or a downlink, a field indicating time resource for CSIRS transmission, a field indicating frequency resource for CSIRS transmission, a field indicating time resource for uplink report, and a field indicating frequency resource for uplink report.

A third feature, combinable with any of the previous or following features, where the first electronic device transmits the uplink feedback to the base station using a Physical Uplink Control Channel (PUCCH) or a Physical Uplink Shared Channel (PUSCH).

A fourth feature, combinable with any of the previous or following features, where the base station includes a 5G-capable base station, and the first and second electronic devices communicate through a sidelink.

In a sixth implementation, a non-transitory computer-readable medium storing computer instructions for transmission beam control in a data communication, that when executed by one or more hardware processors, cause the one or more hardware processors to perform operations comprising: receiving, by a first electronic device and from a base station, configuration of one or more beam management reference signals (BMRSs) on a sidelink between the first electronic device and a second electronic device and uplink feedback configuration; receiving, by the first electronic device and from the base station, first downlink control information (DCI); and in response to receiving the first DCI: receiving and measuring, by the first electronic device and based on the received configuration of one or more BMRSs, a plurality of BMRSs transmitted by the second electronic device; and transmitting, by the first electronic device and based on the received uplink feedback configuration, uplink feedback to the base station.

The foregoing and other described implementations can each, optionally, include one or more of the following features:

A first feature, combinable with any of the following features, where the first electronic device and the second electronic device are within coverage of the base station, and the first electronic device receives the configuration of one or more BMRSs and the uplink feedback configuration directly from the base station.

A second feature, combinable with any of the previous or following features, where the one or more BMRSs includes sidelink channel state information reference signal (SL-CSIRS), the first DCI is used to instruct the first electronic device to measure a plurality of SL-CSIRSs and transmit a beam report based on the measured plurality of SL-CSIRSs to the base station, and the first DCI includes a field indicating CSIRS beam pattern, a field indicating CSIRS transmission on a sidelink or a downlink, a field indicating time resource for CSIRS transmission, a field indicating frequency resource for CSIRS transmission, a field indicating time resource for uplink report, and a field indicating frequency resource for uplink report.

A third feature, combinable with any of the previous or following features, where the first electronic device transmits the uplink feedback to the base station using a Physical Uplink Control Channel (PUCCH) or a Physical Uplink Shared Channel (PUSCH).

A fourth feature, combinable with any of the previous or following features, where the base station includes a 5G-capable base station, and the first and second electronic devices communicate through a sidelink.

In a seventh implementation, a method includes: transmitting, by a base station and to a first electronic device, configuration of one or more beam management reference signals (BMRSs) on a sidelink between the first electronic device and a second electronic device and uplink feedback configuration; transmitting, by the base station and to the first electronic device, first downlink control information (DCI); transmitting, by the base station and to the second electronic device, second DCI; and receiving, by the base station and from the first electronic device, uplink feedback.

The foregoing and other described implementations can each, optionally, include one or more of the following features:

A first feature, combinable with any of the following features, where the first DCI is used to instruct the first electronic device to measure a plurality of BMRSs and transmit a beam report based on the measured plurality of BMRSs to the base station, and the second DCI is used to instruct the second electronic device to transmit the plurality of BMRSs.

A second feature, combinable with any of the previous or following features, further comprising: determining, by the base station, a best beam pattern based on the received uplink feedback from the first electronic device; and transmitting, by the base station, the best beam pattern to the second electronic device.

In an eighth implementation, a base station includes: a non-transitory memory storage comprising instructions; and one or more hardware processors in communication with the memory storage, where the one or more hardware processors execute the instructions to perform operations comprising: transmitting, to a first electronic device, configuration of one or more beam management reference signals (BMRSs) on a sidelink between the first electronic device and a second electronic device and uplink feedback configuration; transmitting, to the first electronic device, first downlink control information (DCI); transmitting, to the second electronic device, second DCI; and receiving, from the first electronic device, uplink feedback.

The foregoing and other described implementations can each, optionally, include one or more of the following features:

A first feature, combinable with any of the following features, where the first DCI is used to instruct the first electronic device to measure a plurality of BMRSs and transmit a beam report based on the measured plurality of BMRSs to the base station, and the second DCI is used to instruct the second electronic device to transmit the plurality of BMRSs.

A second feature, combinable with any of the previous or following features, the operations further comprising: determining a best beam pattern based on the received uplink feedback from the first electronic device; and transmitting the best beam pattern to the second electronic device.

In a ninth implementation, a non-transitory computer-readable medium storing computer instructions for transmission beam control in a data communication, that when executed by one or more hardware processors, cause the one or more hardware processors to perform operations including: transmitting, by a base station and to a first electronic device, configuration of one or more beam management reference signals (BMRSs) on a sidelink between the first electronic device and a second electronic device and uplink feedback configuration; transmitting, by the base station and to the first electronic device, first downlink control information (DCI); transmitting, by the base station and to the second electronic device, second DCI; and receiving, by the base station and from the first electronic device, uplink feedback.

The foregoing and other described implementations can each, optionally, include one or more of the following features:

A first feature, combinable with any of the following features, where the first DCI is used to instruct the first electronic device to measure a plurality of BMRSs and transmit a beam report based on the measured plurality of BMRSs to the base station, and the second DCI is used to instruct the second electronic device to transmit the plurality of BMRSs.

A second feature, combinable with any of the previous or following features, the operations further comprising: determining, by the base station, a best beam pattern based on the received uplink feedback from the first electronic device; and transmitting, by the base station, the best beam pattern to the second electronic device.

Implementations of the subject matter and the functional operations described in this specification can be implemented in digital electronic circuitry, intangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially-generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a Central Processing Unit (CPU), a Field Programmable Gate Array (FPGA), or an Application-specific Integrated Circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other units suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a ROM or a Random Access Memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a Personal Digital Assistant (PDA), a mobile audio or video player, a game console, a Global Positioning System (GPS) receiver, or a portable storage device, for example, a Universal Serial Bus (USB) flash drive, to name just a few.

Computer-readable media (transitory or non-transitory, as appropriate) suitable for storing computer program instructions and data includes non-volatile memory, media and memory devices, including by way of example, semiconductor memory devices, for example, Erasable Programmable Read-Only Memory (EPROM), Electrically Erasable Programmable Read-Only Memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a Cathode Ray Tube (CRT), Liquid Crystal Display (LCD), Light Emitting Diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other types of touchscreens. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a Command Line Interface (CLI) that processes information and efficiently presents the information results to the user. In general, a GUI may include a plurality of User Interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a Local Area Network (LAN), a Radio Access Network (RAN), a Metropolitan Area Network (MAN), a Wide Area Network (WAN), Worldwide Interoperability for Microwave Access (WIMAX), a Wireless Local Area Network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a method; a non-transitory, computer-readable medium storing computer-readable instructions to perform the method; and a computer system comprising a computer memory interoperably coupled with a hardware processor configured to perform the method or the instructions stored on the non-transitory, computer-readable medium.

What is claimed is:

1. A method comprising:
   receiving, by a first electronic device from a base station, a configuration of one or more beam management reference signals (BMRSs) to be communicated on a sidelink between the first electronic device and a second electronic device and a configuration of one or more sidelink random access channels (SL-RACHs);
   receiving and measuring, by the first electronic device based on the configuration of the one or more BMRSs, a plurality of BMRSs transmitted by the second electronic device; and
   transmitting, by the first electronic device to the second electronic device, a SL-RACH of the one or more SL-RACHs based on a measurement of the plurality of BMRSs and according to the configuration of the one or more SL-RACHs.

2. The method according to claim 1, wherein the first electronic device and the second electronic device are within coverage of the base station, and the first electronic device receives the configuration of the one or more BMRSs and the configuration of the one or more SL-RACHs directly from the base station.

3. The method according to claim 1, wherein the first electronic device is outside coverage of the base station, the second electronic device is within the coverage of the base station, and the first electronic device receives the configuration of the one or more BMRSs and the configuration of the one or more SL-RACHs from the base station through the second electronic device.

4. The method according to claim 1, wherein the one or more BMRSs includes at least one sidelink synchronization signal block (SL-SSB) or at least one sidelink channel state information reference signal (SL-CSIRS).

5. The method according to claim 1, further comprising:
   determining, by the first electronic device and based on the measurement of the plurality of BMRSs, a best BMRS from the plurality of BMRSs, wherein the SL-RACH is associated with the best BMRS.

6. The method according to claim 1, further comprising:
   generating, by the first electronic device, a beam report based on the measurement of the plurality of BMRSs, wherein the beam report includes reference signal receive power (RSRP) of a plurality of beam patterns associated with the plurality of BMRSs; and
   transmitting, by the first electronic device, the beam report to the second electronic device.

7. The method according to claim 1, wherein the base station includes a 5G-capable base station, and the first electronic device and the second electronic device communicate through the sidelink.

8. The method of claim 1, further comprising:
   transmitting, by the first electronic device to the second electronic device, a beam report based on the measurement of the plurality of BMRSs.

9. A first electronic device, comprising:
   a non-transitory memory storage comprising instructions; and
   one or more processors in communication with the non-transitory memory storage, wherein the one or more processors execute the instructions to cause the first electronic device to perform operations comprising:
   receiving, from a base station, a configuration of one or more beam management reference signals (BMRSs) to be communicated on a sidelink between the first electronic device and a second electronic device and a configuration of one or more sidelink random access channels (SL-RACHs);
   receiving and measuring, based on the configuration of the one or more BMRSs, a plurality of BMRSs transmitted by the second electronic device; and
   transmitting, to the second electronic device, a SL-RACH of the one or more SL-RACHs based on a measurement of the plurality of BMRSs and according to the configuration of the one or more SL-RACHs.

10. The first electronic device according to claim 9, wherein the first electronic device is outside coverage of the base station, the second electronic device is within the coverage of the base station, and the first electronic device receives the configuration of the one or more BMRSs and the configuration of the one or more SL-RACHs from the base station through the second electronic device.

11. The first electronic device according to claim 9, wherein the one or more BMRSs includes at least one sidelink synchronization signal block (SL-SSB) or at least one sidelink channel state information reference signal (SL-CSIRS).

12. The first electronic device according to claim 9, the operations further comprising:
determining, based on the measurement of the plurality of BMRSs, a best BMRS from the plurality of BMRSs, wherein the SL-RACH is associated with the best BMRS.

13. The first electronic device according to claim 9, the operations further comprising:
generating a beam report based on the measurement of the plurality of BMRSs, wherein the beam report includes reference signal receive power (RSRP) of a plurality of beam patterns associated with the plurality of BMRSs; and
transmitting the beam report to the second electronic device.

14. The first electronic device according to claim 9, wherein the base station includes a 5G-capable base station, and the first electronic device and the second electronic device communicate through the sidelink.

15. The first electronic device according to claim 9, wherein the first electronic device and the second electronic device are within coverage of the base station, and the first electronic device receives the configuration of the one or more BMRSs and the configuration of the one or more SL-RACHs directly from the base station.

16. A method comprising:
receiving, by a first electronic device from a base station, a configuration of one or more beam management reference signals (BMRSs) to be communicated on a sidelink between the first electronic device and a second electronic device and an uplink feedback configuration;
receiving, by the first electronic device from the base station, first downlink control information (DCI),
wherein the one or more BMRSs include a sidelink channel state information reference signal (SL-CSIRS), the first DCI is configured to instruct the first electronic device to measure a plurality of SL-CSIRSs and transmit a beam report based on the measured plurality of SL-CSIRSs to the base station, and the first DCI includes a field indicating a CSIRS beam pattern, a field indicating CSIRS transmission on a sidelink or a downlink, a field indicating a time resource for CSIRS transmission, a field indicating a frequency resource for CSIRS transmission, a field indicating a time resource for uplink report, or a field indicating a frequency resource for uplink report; and
in response to receiving the first DCI:
receiving and measuring, by the first electronic device based on the configuration of the one or more BMRSs, a plurality of BMRSs transmitted by the second electronic device; and
transmitting, by the first electronic device based on the uplink feedback configuration, uplink feedback to the base station, the uplink feedback being based on a measurement of the plurality of BMRSs.

17. The method according to claim 16, wherein the first electronic device and the second electronic device are within coverage of the base station, and the first electronic device receives the configuration of the one or more BMRSs and the uplink feedback configuration directly from the base station.

18. The method according to claim 16, wherein the first electronic device transmits the uplink feedback to the base station using a Physical Uplink Control Channel (PUCCH) or a Physical Uplink Shared Channel (PUSCH).

19. The method according to claim 16, wherein the base station includes a 5G-capable base station, and the first electronic device and the second electronic device communicate through the sidelink.

20. A method comprising:
transmitting, by a base station to a first electronic device, a configuration of one or more beam management reference signals (BMRSs) to be communicated on a sidelink between the first electronic device and a second electronic device and an uplink feedback configuration;
transmitting, by the base station to the first electronic device, first downlink control information (DCI), the first DCI instructing the first electronic device to measure BMRSs and to report a measurement of the BMRSs to the base station based on the uplink feedback configuration;
transmitting, by the base station to the second electronic device, second DCI, the second DCI instructing the second electronic device to transmit the BMRSs to the first electronic device; and
receiving, by the base station from the first electronic device, uplink feedback, the uplink feedback being based on the measurement of the BMRSs.

21. The method according to claim 20, further comprising:
determining, by the base station, a best beam pattern based on the uplink feedback received from the first electronic device; and
transmitting, by the base station, the best beam pattern to the second electronic device.

22. The method according to claim 20, wherein the one or more BMRSs include a sidelink channel state information reference signal (SL-CSIRS).

23. The method according to claim 22, wherein the first DCI includes a field indicating a CSIRS beam pattern, a field indicating CSIRS transmission on a sidelink or a downlink, a field indicating a time resource for CSIRS transmission, a field indicating a frequency resource for CSIRS transmission, a field indicating a time resource for uplink report, or a field indicating a frequency resource for uplink report.

* * * * *